Figure 1:
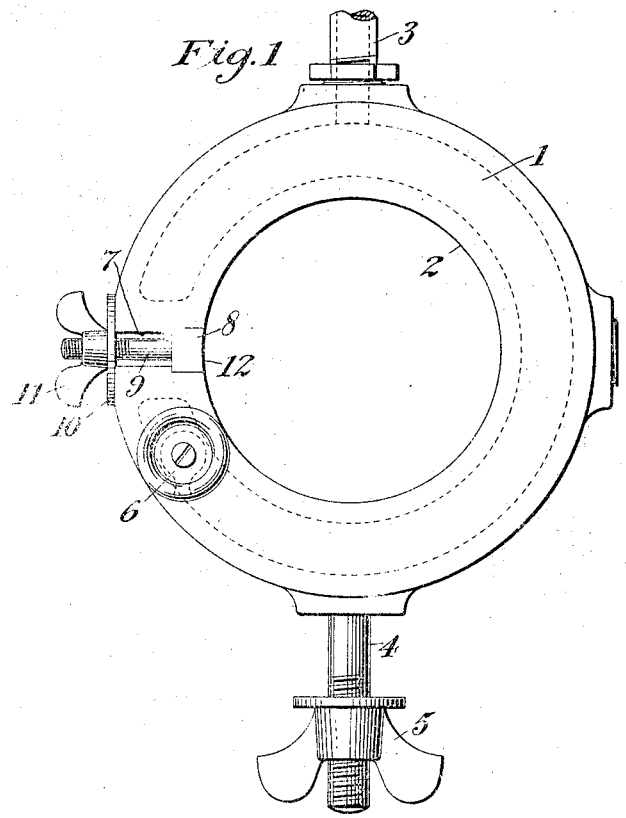

W. FROST.
VULCANIZING APPARATUS.
APPLICATION FILED DEC. 22, 1908.

951,881.  Patented Mar. 15, 1910.

Witnesses:

Inventor:
William Frost
by Henry D. Williams
Attorney.

UNITED STATES PATENT OFFICE.

WILLIAM FROST, OF LONDON, ENGLAND.

VULCANIZING APPARATUS.

951,881.  Specification of Letters Patent.  Patented Mar. 15, 1910.

Application filed December 22, 1908. Serial No. 468,766.

*To all whom it may concern:*

Be it known that I, WILLIAM FROST, a subject of the King of England, residing at London, in England, have invented a certain new and useful Improvement in Vulcanizing Apparatus, of which the following is a specification, reference being had therein to the accompanying drawings, forming part thereof.

My invention relates to improvements in vulcanizing apparatus.

In vulcanizing tubes and other articles of sheet rubber, such as the tubes of pneumatic tires, it is customary to use metal molds, which are heated by steam or otherwise and are provided with openings or cavities of suitable form to embrace closely the articles to be vulcanized so as to subject them to both heat and pressure. Where the articles operated upon are in the form of endless tubes, as in the case of the inner or air tubes of pneumatic tires, the mold used for joining the tubes or similar articles is in the form of a ring, and provision must be made for removing the tubes transversely from the mold, since they obviously cannot be removed endwise. For this purpose such molds have been constructed, heretofore, of two members, each of which comprises substantially one-half of the mold and is provided with means for heating it, and the two members have been removably secured together by hinges and bolts so that they might be separated to permit the removal of the tubes.

In the construction above described the movability of one of the members involves, where steam is used to heat the mold, the use of flexible steam connections or equivalent devices, and the construction is, in general, comparatively cumbersome and expensive.

The object of the present invention is, generally stated, to produce vulcanizing apparatus for jointing tubes and similar articles which shall be simple and inexpensive in construction and convenient and efficient in operation.

More specifically, the object of the invention is to produce a mold consisting mainly of a single stationary heated body and requiring no flexible steam connections or joints.

In carrying out my invention, I avail myself of the flexibility of the articles to be operated upon. Instead of dividing my mold in halves, I use a single body which nearly surrounds the tube or other article and which is heated, as a unit, by steam admitted through stationary connections, or in any other convenient manner. To permit the tubes to be inserted and removed, I make a narrow gap at one point in the body, which is sufficient to admit the tube or other hollow article when it is collapsed. When the mold is in operation, however, this gap is closed and the inner surface of the mold is completed by a small block of metal which is inserted for this purpose. This block is so narrow that no special means are necessary for heating it, since it receives sufficient heat by conduction from the body of the mold.

The invention thus consists, broadly stated, in making the movable member of the mold so small that it may be heated by conduction from the fixed member, while the latter alone is provided with steam connections or other heating means.

I will now describe the embodiment of my invention illustrated in the accompanying drawings, and will thereafter point out my invention in claims.

Figure 2:
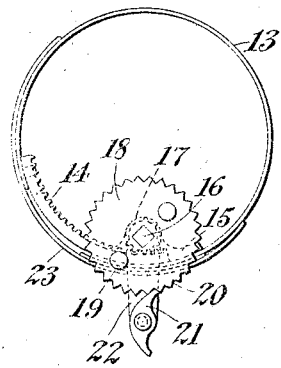
Figure 3:
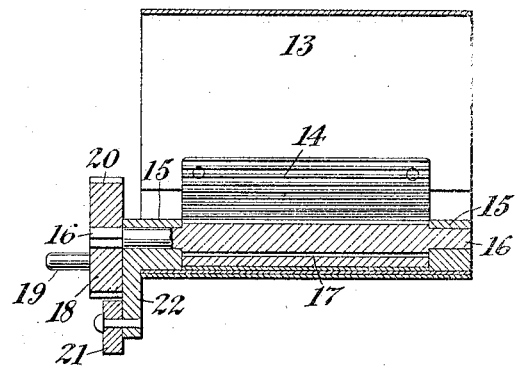

Figure 1 is a front elevation of a vulcanizing mold in condition for operation. Fig. 2 is an end view of an expanding mandrel used in connection with the mold of Fig. 1. Fig. 3 is a longitudinal section of the mandrel of Fig. 1.

The mold illustrated in Fig. 1 comprises a body 1 of circular form, which has a circular inner surface 2 constituting the vulcanizing surface of the mold. The mold is hollow, as indicated in dotted lines, and is heated by steam or other hot fluid admitted through a pipe 3. The mold is mounted upon a work bench or in any convenient position by means of a threaded stem 4 and a wing nut 5. A cock 6 is provided for the escape of air and water of condensation.

A narrow gap 7 is provided to admit and remove the work from the mold. When the mold is in use this gap is closed by a block 8 of metal, which is secured in place by means of a threaded stem 9 fixed to the block and carrying a washer 10 and a wing nut 11. The inner face 12 of this block is formed as a continuation of the inner surface 2 of the mold, so that when the block is in place an unbroken surface is presented to the work. The block is so small that no means are necessary for heating it independently, and it may therefore be removed and replaced very quickly and conveniently upon loosening the wing nut 11 by an endwise movement of the block in the gap 7.

In jointing a rubber tube it is customary to support the tube interiorly by a split mandrel which is passed over the tube, the ends to be jointed being doubled and redoubled over the outside of this mandrel. Where the mold is constructed as in the present invention, it is desirable to use in connection with it a mandrel which may be more or less expanded so as to subject the work to pressure from within, and I have illustrated a suitable mandrel for this purpose in Figs. 2 and 3. This mandrel is the subject of a patent issued to Walter Henry Welch, on June 1, 1909, No. 923,224, and is not specifically claimed herein.

The mandrel comprises a body 13 of flexible sheet metal having a generally cylindrical form. This body is interrupted to provide a gap for the admission of the work. To expand the mandrel one edge of the body at the gap is provided with a curved rack 14, while the opposite edge is secured to lugs 15, in which is journaled a shaft 16. The shaft is provided with gear teeth 17 meshing with the rack 14. A wheel 18 is fixed to one end of the shaft and is provided with two pins 19, by which the wheel and the shaft may be turned. By turning the shaft the edges of the body 13 may be moved apart so as to increase the diameter of the body and force it outwardly against the work. To hold the mandrel in expanded position the wheel 18 is provided with ratchet teeth 20, which may be engaged by a pawl 21 pivoted on an arm 22 integral with one of the lugs 15. The gap in the mandrel is bridged by a curved plate 23 having a free sliding engagement with the extremities of the body 13.

Various modifications may be made in the embodiment of my invention hereinbefore described and illustrated in the accompanying drawings, within the nature of the invention and the scope of the following claims.

I claim:

1. An annular mold for vulcanizing tubes comprising a body portion having provision for heating it and formed to nearly surround the tube but provided with a gap for the insertion or removal of the tube, the body portion having an inner vulcanizing surface to engage the outer surface of the tube, and a removable metal block inserted in said gap and heated by conduction from the body portion, the block having an inner vulcanizing surface continuous with the inner surface of the body portion.

2. Apparatus for vulcanizing tubes comprising, in combination, a mold formed to nearly surround a tube but having a narrow gap, a removable metal block inserted in said gap and having a surface continuous with the inner surface of the mold so as to form an unbroken vulcanizing surface to engage the outer surface of the tube, and a mandrel provided with means for expanding it to force the tube outwardly against the vulcanizing surface.

In testimony whereof I affix my signature in presence of two witnesses.

WILLIAM FROST.

Witnesses:
H. HARVEY FROST,
H. D. JAMESON.